United States Patent [19]

Popp

[11] Patent Number: 4,905,242

[45] Date of Patent: Feb. 27, 1990

[54] PIPELINED ERROR DETECTION AND CORRECTION APPARATUS WITH PROGRAMMABLE ADDRESS TRAP

[75] Inventor: Raymond H. Popp, Columbia, Md.

[73] Assignee: The United States of America as represented by the Secretary of the Air Force, Washington, D.C.

[21] Appl. No.: 59,696

[22] Filed: Jun. 9, 1987

[51] Int. Cl.[4] ............................................. G06F 11/10
[52] U.S. Cl. ................................................... 371/40.1
[58] Field of Search ............................ 371/13, 38, 51; 365/200

[56] References Cited

U.S. PATENT DOCUMENTS

| | | | |
|---|---|---|---|
| 3,644,902 | 2/1972 | Beausoleil | 340/173 R |
| 4,319,356 | 3/1982 | Kocol | 371/13 X |
| 4,335,459 | 6/1982 | Miller | 371/38 |
| 4,371,930 | 2/1983 | Kim | 371/13 X |
| 4,488,298 | 12/1984 | Bond et al. | 371/11 |
| 4,535,455 | 8/1985 | Peterson | 371/13 |
| 4,646,303 | 2/1987 | Narusawa | 371/38 |
| 4,646,304 | 2/1987 | Fossati | 371/13 X |

OTHER PUBLICATIONS

Advanced Micro Devices, The AM2900 Familt Data Book with Related Support Circuits, Copyright 1979 b Advanced Micro Devices, Inc. pp. 2-312—2-328.

*Primary Examiner*—Jerry Smith
*Assistant Examiner*—Robert W. Beausoliel
*Attorney, Agent, or Firm*—William Stepanishen; Donald J. Singer

[57] ABSTRACT

An error detection and correction apparatus utilizing seven internally generated check bits which are applied to incoming data signals on the next clock. The combination data signals are written into the system random access memory and are reapplied to the error detection and correction apparatus. An address trap register is programmed to trap the address of the single or multiple bit errors. The address trap register also captures the error flags and the syndrome bit so that detected faults can be isolated. A single bit error correction circuit is utilized to correct single bit errors in the data signal.

5 Claims, 2 Drawing Sheets

PIPELINED ERROR DETECTION AND CORRECTION APPARATUS WITH PROGRAMMABLE ADDRESS TRAP

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an error detection apparatus, and in particular to a pipelined error detection and correction apparatus utilizing a programmable address trap.

It is well known that the reliability of data stored in memory devices can be significantly increased through the use of error detection and correction (EDC) techniques. Typically, the devices to implement these techniques can detect and flag all single, double, and some more than two bit errors. Single bit errors (within a word) can also be corrected. These error detection and correction techniques can be used not only for fault detection but also for fault isolation. In order to isolate a fault to the memory chip level, it is necessary to know not only that an error has occurred but also whether it was a single or multiple bit error and at what memory address it occurred. However, the addition of error detection and correction circuits create and/or present the following problems:

A. Loading - The addition of error detection and correction devices increases the load on the output of the memory devices and therefore the device access time. This problem is typically solved by adding buffer devices. This invention solves the problem by adding a separate input port for the memory devices which presents a minimum load without increasing the component count.

B. Speed - Newer and faster memory devices require faster error detection and correction devices. Currently available error detection and correction devices were designed for applications where they are tightly coupled to the central processing unit (CPU) and therefore do not take advantage of speed enhancements permitted by a pipelined error detection and correction device. This invention makes use of clocked input and output pipelined registers and can perform a correction in approximately 25 nanoseconds (typical at 25 degrees C.). This can be achieved by using VHSIC CMOS technology. At this speed all data can be clocked through the error detection and correction device pipeline registers and the data flow is not interrupted to perform an error correction operation.

C. Fault Isolation - Fault isolation can be simple in a memory that is tightly coupled to a central processing unit, but can be difficult when the memory array is being accessed over a system bus which interfaces the memory array to the central processing unit through two bus interface units. In such a case, the central processing unit does not know the memory address of the error. This invention solves the problem by having programmable error flag, check bit, and address traps which the central processing unit can read via the data port.

D. Testing - Adding an error detection and correction device to the memory system now requires a test method to validate the proper operation of the error detection and correction device. Some current error detection and correction devices have diagnostic modes but their ability to provide fault isolation features is limited. This invention incorporates the typical diagnostic features but also has data paths that permit wrap tests of the address and check bits.

E. Device Count - Additional devices need to be added in order to solve most of the above problems. This in turn causes more problems. This invention provides a monolithic solution to all the above problems.

The state of the art of error detection and correction apparatus are well represented and alleviated to some degree by the prior art apparatus and approaches which are contained in the following U.S. patents:

U.S. Pat. No. 3,644,902 issued to Beausoleil on Feb. 22, 1972;

U.S. Pat. No. 4,335,459 issued to Miller on June 15, 1982; and

U.S. Pat. No. 4,488,298 issued to Bond et al on Dec. 11, 1984.

U.S. Pat. No. 3,644,902, Beausoleil, discloses a memory having circuits for correcting single errors in a word read from the memory with means to reconfigure the memory so that a configuration having a double, uncorrectable, error is changed to a configuration having two single, correctable errors.

U.S. Pat. No. 4,335,459, Miller, discusses the production yield and reliability of random access integrated circuit memory chips which are greatly increased by providing a memory capacity greater than the nominal capacity of the chip and providing error correction circuitry on the chip.

U.S. Pat. No. 4,488,298, Bond et al, relates to a fault alignment exclusion method and apparatus which operates to prevent the alignment of two or more defective bit storage locations at an address in a memory array. The present invention is directed to an error detection and correction apparatus which is intended to satisfy the above-mentioned prior art problems.

SUMMARY OF THE INVENTION

The present invention utilizes a pipelined error detection and correction circuit with programmable address trap and is a monolithic, solid state, gate array personalization design for use in memory systems to provide fault tolerance, fault isolation, and diagnostic features. It provides the ability to detect all single and double bit errors in a 32 bit data word. It also detects some three or more bit errors in a 32 bit data word. All single bit errors can be corrected; all double bit errors will be flagged but not corrected; and some three or more bit errors will be flagged. Data is pipelined through the device from an input port and register to an output register and port. Therefore all operations are performed within one clock period. There is a built-in trap which can be programmed to trap the address of the first single or multiple bit error. This trap also captures the error flags and the syndrome bits so that detected faults can be isolated. The contents of the trap can be read out of the data output port.

It is one object of the present invention, therefore, to provide an improved error detection and correction apparatus.

It is another object of the present invention to provide an improved error detection and correction apparatus which uses a separate input port for the memory devices and presents a minimum load without increasing the component count.

It is yet another object of the present invention to provide an improved error detection and correction apparatus which utilizes clocked input and output pipelined registers and can perform a correction in approximately 25 nanoseconds.

It is still a further object of the present invention to provide an improved error detection and correction apparatus wherein all data can be clocked through the pipeline registers and the data flow is not interrupted to perform an error correction operation.

It is a further object of the present invention to provide an improved error detection and correction apparatus having programmable error flag, check bit, and address traps which the central processing unit can read via the data output port.

It is yet another object of the present invention to provide an improved error detection and correction apparatus which incorporates the typical diagnostic features and also has data paths that permit wrap test of the address and check bits.

mode. One input port is from the array of memory devices and provides a minimum load to the memory devices. The other data input port is for the source data when the memory is in the "write" mode. The data input register unit 18 is a 32 bit register that holds the input data while parity bits are being generated. The check bit register unit 20 holds the check bits from the selected random access memory (SRAM) while the gate array logic checks for errors in the data. The check bit parity trees unit 22 generate the parity bits needed based on the truth table for a modified Hamming (39, 32) code (see Table I).

The syndrome generator logic input multiplexer unit 24 (SGLI mux) outputs zeros in the generate mode, outputs the check bits in the detect/correct mode, or diagnostic check bits in certain diagnostic modes. The syndrome generator logic unit 26 is a set of seven (7) exclusive nor gates which operate on the output of the check bit parity trees and the output of the syndrome generator logic input multiplexer.

TABLE I

MODIFIED HAMMING (39, 32) CODE USED FOR THE ERROR DETECTION AND CORRECTION APPARATUS

| CHECK WORD BIT | 32-BIT DATA WORD | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| CS0 | X | | X | X | | X | | | | | X | | X | X | X | |
| CS1 | | | | X | | X | | X | | X | | X | | X | X | |
| CS2 | X | | X | | | X | X | | X | | | | X | X | | X |
| CS3 | | | X | X | X | | | | X | X | X | | | | X | X |
| CS4 | X | X | | | | | | | | X | X | X | X | X | X | |
| CS5 | X | X | X | X | X | X | X | X | | | | | | | | |
| CS6 | X | X | X | X | X | X | X | X | | | | | | | | |

| CHECK WORD BIT | 32-BIT DATA WORD | | | | | | | | | | | | | | | |
|---|---|---|---|---|---|---|---|---|---|---|---|---|---|---|---|---|
| | 15 | 14 | 13 | 12 | 11 | 10 | 09 | 08 | 07 | 06 | 05 | 04 | 03 | 02 | 01 | 00 |
| CS0 | | X | | | X | | X | X | X | X | | X | | | | X |
| CS1 | | | X | | | X | | X | | X | | X | | X | X | X |
| CS2 | X | | X | | | X | X | | X | | | X | X | | | X |
| CS3 | | | X | X | X | | | | X | X | X | | | | X | X |
| CS4 | X | X | | | | | | | X | X | X | X | X | X | | |
| CS5 | X | X | X | X | X | X | X | X | | | | | | | | |
| CS6 | | | | | | | | | X | X | X | X | X | X | X | X |

The seven checks bits (CS0 through CS6) are parity bits derived from the matrix of data bits as indicated by "X" for each bit.

These and other advantages, objects and features of the invention will become more apparent after considering the following description taken in conjunction with the illustrative embodiment in the accompanying drawings.

DESCRIPTION OF THE PREFERRED EMBODIMENT

Figure 1A:
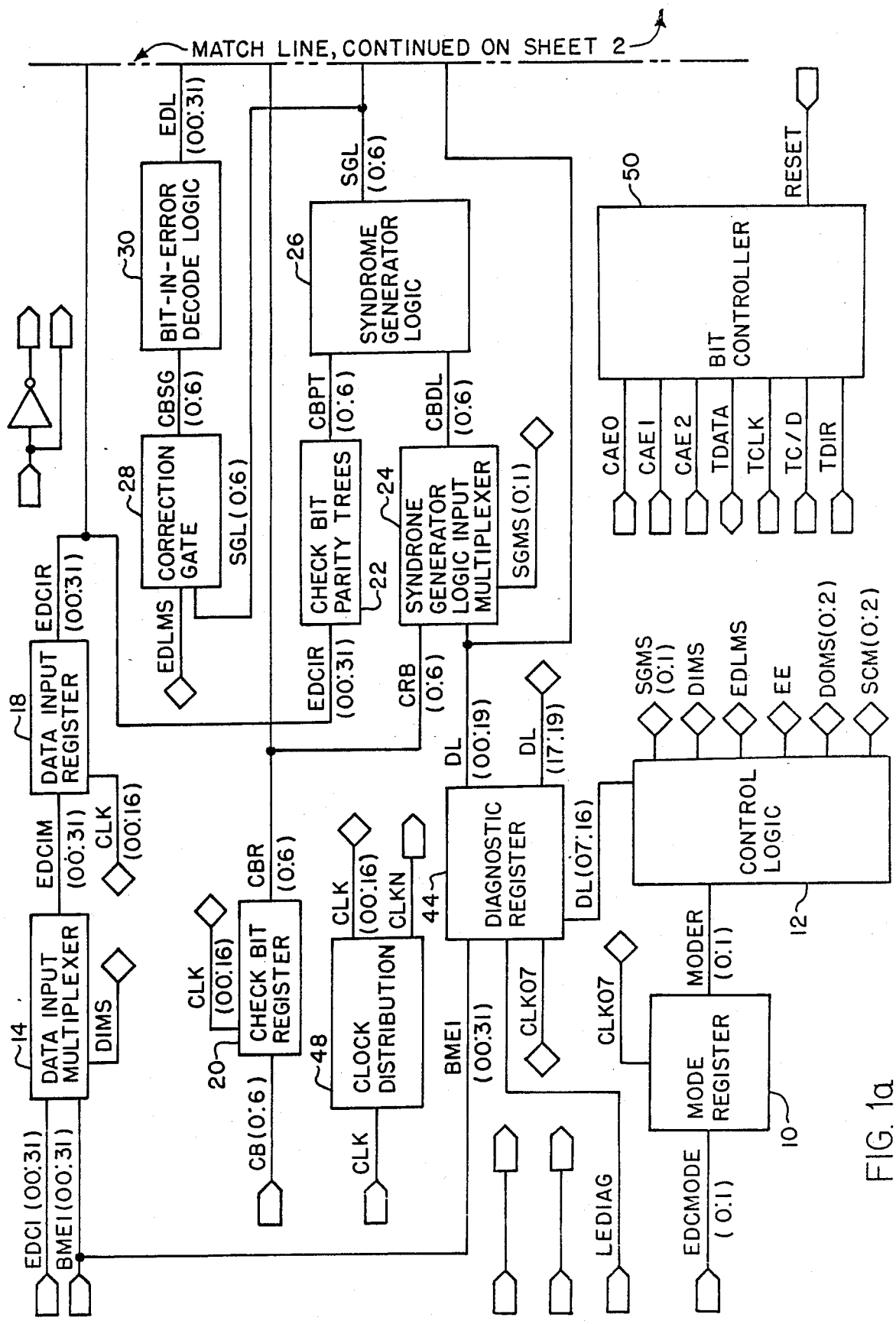
FIGS. 1a and 1b are a block diagram of the error detection and correction apparatus according to the present invention.
Figure 1B:
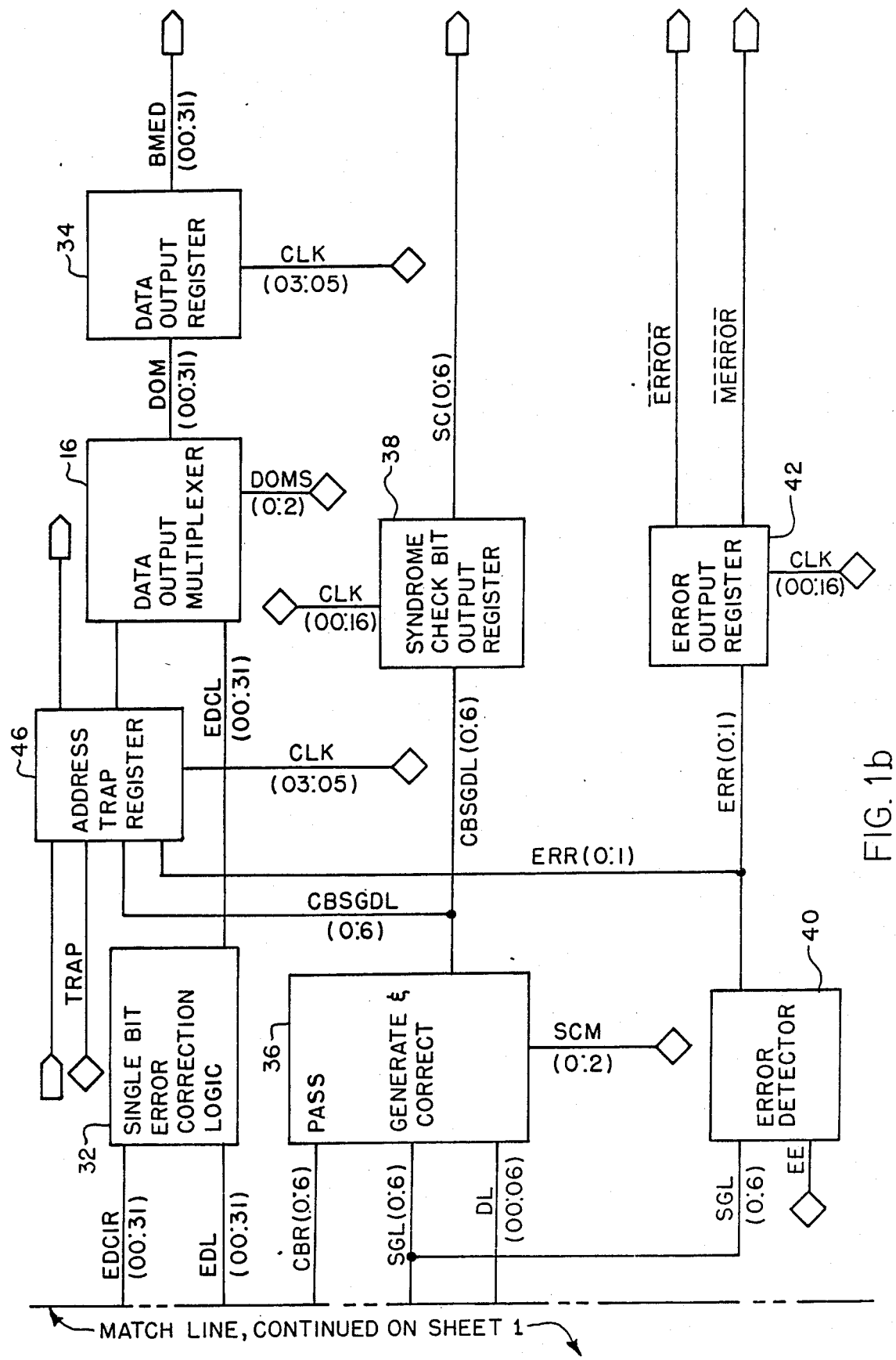

Turning now to FIG. 1, there is shown a block diagram of the error detection and correction apparatus, the error detection and correction gate array (GA) has the following functional elements. The mode register 10 is loaded by the clock signal, CLK 02 and holds the error detection and correction gate array mode such as, Generate, Detect/Correct, Diagnostic, etc. The control logic register 12 decodes the mode lines for mode and diagnostic information to control the data in and data out multiplexers 14, 16, and to enable or inhibit certain features.

The data input multiplexer unit 14 selects between two 32 bit data input ports depending on the gate array The correction gate unit 28 is a set of seven NAND gates which output all ones in the generate modes and the syndrome bits inverted in the detect/correct modes. The bit in-error decode logic unit 30 receives the seven bits from the correction gate and decodes them for single bit errors. If there is a single bit error then one of the 32 outputs will be a zero. If there is not a single bit error then all 32 outputs will be ones.

The single bit error unit 32 correction logic receives the 32 bits of data from the data input register and the 32 bits from the bit-in-error decode logic. If there is a single bit error then one of the 32 bits from the bit-in-error decode logic will be a zero. The single bit error correction logic will invert that bit in the data from the data input register thereby correcting it. Data that is error free or that has more than one error is passed with no correction.

The data output multiplexer unit 16 is a thirty two bit 2 to 1 multiplexer that selects between the output of the single bit error correction logic and address trap register. The data output register unit 34 is a thirty two bit register that holds the data from the data output multiplexer.

The syndrome check multiplexer unit 36 is a seven bit 3 to 1 multiplexer that selects between inputs from the check bit register, inputs from the syndrome generator logic, or inputs from the diagnostic register.

The syndrome/check bit output register unit 38 is a seven bit register that receives seven bits from the syndrome check multiplexer and outputs them from the error detection and correction gate array.

The error detector unit 40 decodes the output of the syndrome generator logic to determine whether no error, a single bit error, a double bit error, or more than a double bit error has occurred. The error output register unit 42 receives inputs from the error detector and outputs them from the error detection and correction gate array.

The diagnostic register unit 44 is an eighteen bit register that is loaded from the data input port under control of the LEDIAG signal. Bits 0 through 6 provide the diagnostic check bits. Bits 7 through 14 provide error detection and correction control signals. Bits 15 through 17 control the address trap.

The address trap register unit 46 is a multiple level register that is designed to trap the address at which an error occurs. It outputs thirty two bits to the data output multiplexer. Bits 0 through 21 contain the address data. Bit 22 is always zero. Bits 23 through 29 are the output of the syndrome check multiplexer at the time of the trapped error. Bits 30 and 31 are the output of the error detector at the time of the trapped error.

The clock distribution unit 48 logic provides the buffering and drive for the clock signal to all of the error detection and correction gate array registers. The built-in test controller unit 50 is standard on all VHSIC gate arrays. It provides a means for a built-in test of the error detection and correction gate array. The built-in test controller may be used to verify operation of the error detection and correction gate array at any test level from wafer test to module or system level test where it may be used to fault isolate down to the component i.e., gate array level.

Operating and Diagnostic Modes

1. EDC Generate Mode

When data is being written into the RAMs the error detection and correction gate arrays is put in the generate mode. The data is received as thirty two bit words. These words are clocked into the error detection and correction gate array where seven check bits are generated. On the next clock the thirty two data bits and seven check bits are output from the EDC gate array. These thirty nine bits are then written into the selected RAMs. The seven check bits are generated by using a modified Hamming 39/32 code. The particular code was selected due to its ability to detect and correct all single bit errors and to detect all double bit errors. This code also detects some error combinations of three or more bits.

2. EDC Detect/Correct Mode

When data is being read from the RAMs, the error detection and correction gate array is put into the Detect/Correct mode. In this mode it receives thirty nine bits of data from the RAM array. This data is clocked into the thirty two bit data input register and the seven bit check bit register. There are two discrete outputs from the error detection and correction gate array which are enabled in this mode. They are an error flag (ERROR) and a multiple bit error flat (MERROR). They flag the following conditions:

| ERROR* | MERROR* | Condition |
| --- | --- | --- |
| HIGH | HIGH | No error detected |
| LOW | HIGH | Single bit error detected/corrected |
| LOW | LOW | Multiple bit error detected |

Note:
The "*" = an active low signal

3. EDC Diagnostic Modes

The error detection and correction gate array has diagnostic modes which allow it to be programmed and tested when it is in an operating module. The following modes are available:

(a) Diagnostic Generate
(b) Diagnostic Detect/Correct
(c) Diagnostic Detect/Correct with ERROR flags inhibited
(d) Diagnostic Pass
(e) Reset Address Trap
(f) Set Address Trap for single bit errors
(g) Set Address Trap for multiple bit errors
(h) Set Address Trap for any errors
(i) Read Address Trap
(j) Special Diagnostic modes which allow the BMM to control the EDC gate array data paths Experimental Results - The RTL model of the EDC gate array has been verified by exercising it at the gate array level. The test vectors used verified its ability to generate check bits in the "Write" mode and to detect and correct single bit errors in the "Read" mode. The ability to pass error free data and to detect all two bit errors was also verified as was the address trap feature.

Equivalents and alternatives - The error detection and correction gate array could be implemented in technologies other than the VHSIC CMOS which was presented here. However, non-VHSIC technologies would probably be slower although this may be acceptable in some applications. The choice of a 5 volt device rather than a 3.3 volt device may be preferred in some applications. The total gate count for the described design was 2588 including the BIT controller which requires 621 gate sites. Other techniques for providing built-in test could be implemented without affecting the basic error detection and correction operational and diagnostic modes. Other monolithic alternatives would have to be able to provide the required number of I/0 pins and have the necessary number of available gate sites. Non monolithic alternatives will significantly increase the device count, be slower, dissipate more power, be less reliable, and not be able to provide the diagnostic features.

Although the invention has been described with reference to a particular embodiment, it will be understood to those skilled in the art that the invention is capable of a variety of alternative embodiments within the spirit and scope of the appended claims.

What is claimed is:

1. An error detection and correction apparatus with programmable address trap comprising in combination:
   means for receiving and holding data signals, said data means receiving data signals from a random access memory,
   means for generating check bits, said check bit means generating a predetermined number of check bits, said check bits are parity bits which are derived from said data signals, means for outputting signals, said signal output means operatively connected to said data means and said check bit means to receive said data signals and said check bits therefrom, said signal output means applying said data signals and check bits to said random access memory, said random access memory applying said data signals and check bits to said data means, means for error correction, said error correction means receiving said check bits and said data signals from said data means, said error correction means decodes said check bits for signal bit errors, said error correction means will correct a single bit error in said data signals by inverting the error bit in said data signals, said data signals either error free or error corrected, is passed to said signal output means, said error correction means provides an error signal, said error signal is coded to represent either no error, a single bit error, a double bit error, or more than a double bit error, an address trap register operatively connected to said signal output means to trap the address of said data signal at which an error occurs, and, means for error detection, said error detection means operatively connected to said error correcting means to receive said error signal therefrom, said error detection means decoding said error signal to determine the error state.

2. An error detection and correction apparatus as described in claim 1 wherein said data means comprises in combination:
   a data-in multiplexer to alternatively receive said data signals at a first port and said data signals and check bits at a second port, and,
   a data-in register to receive and hold said data bits from said data-in multiplexer.

3. An error detection and correction apparatus as defined in claim 1 wherein said predetermined number of check bits comprise seven bits.

4. An error detection and correction apparatus as defined in claim 1 wherein said signal output means comprises in combination:
   a data-out multiplexer is operatively connected to said error correction means and said address trap register to select the output from either, and,
   a data-out register operatively connected to said data-out multiplexer to receive data signals therefrom.

5. An error detection and correction apparatus as defined in claim 1 wherein said error correction means comprises in combination:
   a correction gate to correct said data signals,
   a bit-in error decode logic operatively connected to said correction gate to decode the signal therefrom for single bit errors, said bit-in error decode logic providing an error correction signal, and
   a single bit error correction logic operatively connected to said data means and said bit-in-error decode logic to correct said data signals as directed by said error correction signal.

* * * * *